United States Patent [19]
Jung

[11] Patent Number: 5,435,613
[45] Date of Patent: Jul. 25, 1995

[54] MAGNETIC LIFTING APPARATUS

[75] Inventor: Dong W. Jung, Pusan, Rep. of Korea

[73] Assignee: Hyung Jung, Pusan, Rep. of Korea

[21] Appl. No.: 159,533

[22] Filed: Dec. 1, 1993

[30] Foreign Application Priority Data

Dec. 15, 1992 [KR] Rep. of Korea .................. 92-25668

[51] Int. Cl.⁶ .......................... B66C 1/04; H01F 7/04
[52] U.S. Cl. .................. 294/65.5; 335/288; 335/295
[58] Field of Search ............. 294/65.5; 335/285, 288, 335/291, 294–298, 302, 306

[56] References Cited

U.S. PATENT DOCUMENTS

| | | | |
|---|---|---|---|
| 2,471,067 | 5/1949 | Hitchcock | 335/295 |
| 3,812,629 | 5/1974 | Campbell | 335/295 X |
| 4,055,824 | 10/1977 | Baermann | 335/288 |
| 4,250,478 | 2/1981 | Cardone et al. | 335/288 |
| 4,379,277 | 4/1983 | Braillon | 335/295 |

FOREIGN PATENT DOCUMENTS

| | | | |
|---|---|---|---|
| 1118574 | 11/1961 | Germany | 335/295 |
| 2337887 | 2/1975 | Germany | 335/295 |

Primary Examiner—Johnny D. Cherry
Attorney, Agent, or Firm—Birch, Stewart, Kolasch & Birch

[57] ABSTRACT

A magnetic lifting apparatus includes a plurality of magnetic substances, a plurality of pairs of first permanent magnets, a plurality of rotors having a pair of second permanent magnets, respectively, and an on/off switch handle connected to the rotors whereby upon rotating the on/off switch handle, the magnetic apparatus has a magnetic activity or not so as to attach to or release from the object.

6 Claims, 3 Drawing Sheets

MAGNETIC LIFTING APPARATUS

BACKGROUND OF THE INVENTION

1. Field of the Invention

The present invention relates to a magnetic lifting apparatus and more particularly, to an improved magnetic lifting apparatus including a plurality of magnetic substances, having pairs of first permanent magnets disposed in the magnetic substances, rotors having pairs of second permanent magnets disposed therein, and a handle connected to the rotor whereby upon rotating the handle, when the first permanent magnets match with the second permanent magnets at a same magnetic pole, the apparatus attracts an object to be transferred or lifted and in an opposite direction, the apparatus releases the object.

2. Description of Related Art

Generally, several magnetic apparatuses for use in lifting objects are known in the art. However, such magnetic apparatuses have proven to be unpractical for lifting and releasing objects.

In order to solve the above problems, the present inventor has entitled Korean Utility Model Patent No. 56,701 (Published No. 91-1064), which disclosed a magnetic attracting apparatus which includes a plurality of units wherein each unit is composed of a magnetic substance, a rotor and a magnetic substance, and a circular axle with a tip, a plurality of connecting members for connecting the units, and a top cover fixable to the units by a screw bolt so that the magnetic activity is weak and it is difficult to hold an object under impact.

SUMMARY OF THE INVENTION

Accordingly, it is an object of the present invention to provide an improved magnetic lifting apparatus, which eliminates the above problems encountered with a conventional apparatus.

Another object of the present invention is to provide a magnetic lifting apparatus including a plurality of magnetic substances, a plurality of pairs of first permanent magnets, a plurality of rotors having corresponding pairs of second permanent magnets respectively, and an on/off switch handle connected to the rotors whereby upon rotating the on/off switch handle, the magnetic lifting apparatus either has a magnetic activity or no magnetic activity so as to attach to or release from the object, respectively.

Still another object of the present invention is to provide an improvement for a magnetic lifting apparatus which further includes a top cover and both side wall covers having screw bolts for firmly attaching to the magnetic substances with a melting method, and nonmagnetic center beams attached to the magnetic substances with a melting method whereby the magnetic apparatus can hold under any impact.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
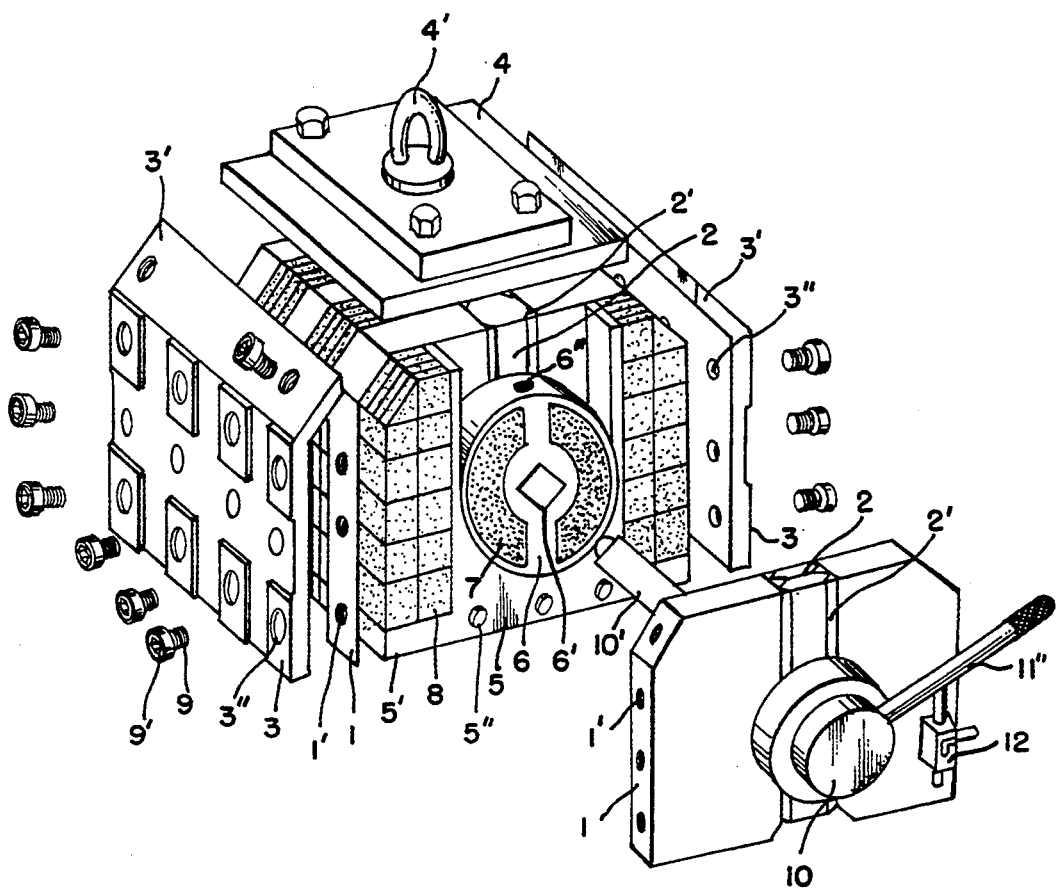
FIG. 1 is an exploded perspective view of the magnetic lifting apparatus according to the present invention.

Referring now in detail to the drawings for the purpose of illustrating preferred embodiments of the present invention, the magnetic lifting apparatus as shown in FIGS. 1, 2, 3, and 4, comprises a pair of side wall covers 3, a top cover 4 having a link 4', a plurality of rotor seat members 5 each having a rotor 6, and a plurality of magnetic substances 1 for alternately aligning with the rotor seat members 5. The side walls 3 have an upper angled portion 3', and side walls 3, the top cover 4, and the rotor seat member 5 are all made of nonmagnetic materials.

Figure 6A:
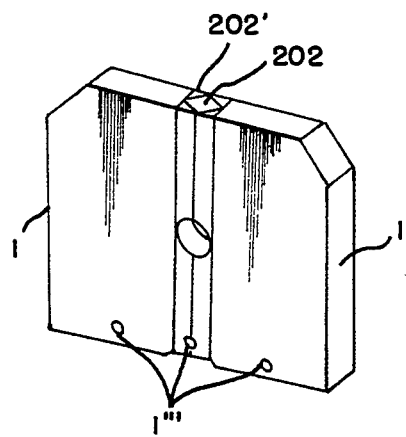
FIGS. 6A and 6B are perspective views of third and fourth embodiments of the magnetic lifting apparatus according to the present invention showing a right hexagonal center beam and rectangular tetragonal center beam disposed between a pair of magnetic substances, respectively.
Figure 6B:
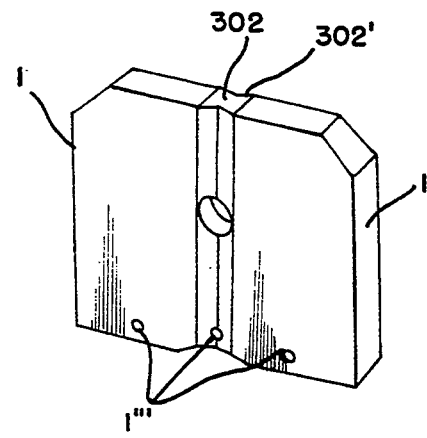

Each rotor seat member 5 includes a plurality of pins 5"0 slidably inserted into a corresponding plurality of pin apertures 1''' (FIG. 3) of the magnetic substances 1 (FIGS. 6A and 6B). The pins 5'' and pin apertures 1''' are disposed on the lower portions of rotor seat members 5 and magnetic substances 1, respectively. Each rotor seat member 5 further includes a pair of first permanent magnets 8 disposed at the left and right sides and disposed on a pair of magnet supports 5'.

The rotor 6 rotatably disposed on an arc-shaped seat area includes a tetragonal axial aperture 6' for slidably receiving a tetragonal axle 10' and a pair of second permanent magnets 7 disposed at the left and right sides thereof.

Figure 2:
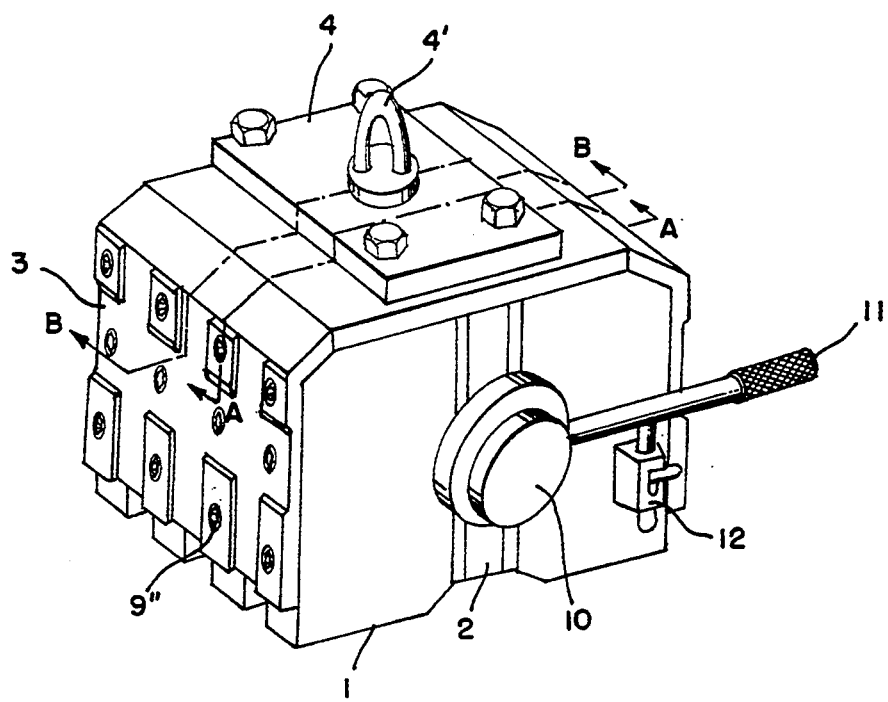
FIG. 2 is a perspective view of the magnetic lifting apparatus according to the present invention.

Each magnetic substance 1 includes a non-magnetic center beam 2 having a multiangular configuration. The center beam 2 becomes a composite plate with a first melting portion 2' and a plurality of side screw apertures 1' for slidably receiving a plurality of screw bolts 9 through a plurality of side cover apertures 3'' of the side wall covers 3, respectively. At this time, a bolt head 9' becomes a composite plate with a second melting portion 9'' (FIGS. 2 and 3).

As shown in FIG. 1, one outer magnetic substance 1 includes a rotating member 10, an on/off switch handle 11 attached to the rotating member 10, and a fixing member 12 thereby fixing the on/off switch handle 11.

Figure 3:
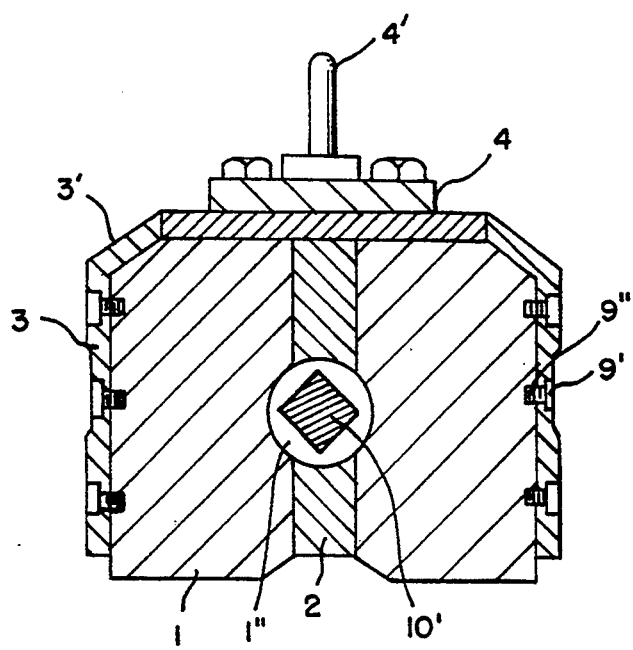
FIG. 3 is a sectional view taken along line A—A of FIG. 2.
Figure 4:
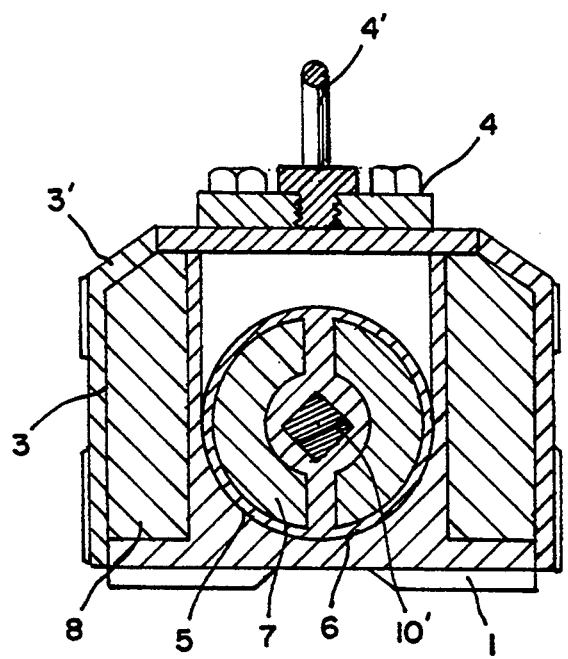
FIG. 4 is a sectional view taken along line B—B of FIG. 2.

Also, the tetragonal axle 10' is tightly inserted into the tetragonal axial apertures 6' of the rotors 6 and slidably inserted into apertures 1'' of magnetic substances 1 (FIG. 3).

Accordingly, the on/off handle 11 is in an on-position when the magnetic polarity of the pair of second permanent magnets 7 of the rotor 6 are the same as the magnetic polarity of the pair of first permanent magnets 8 of the rotor seat member 5. On the contrary, the on/off switch handle 11 is in an off-position.

Figure 5:
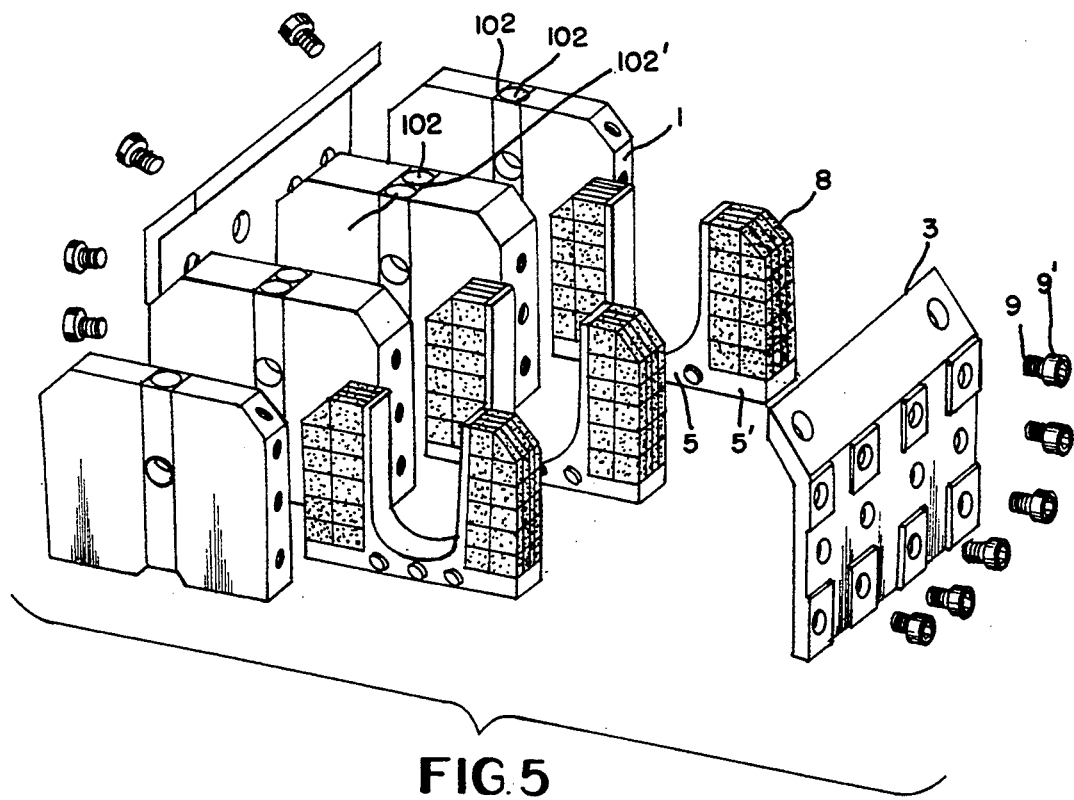
FIG. 5 is an exploded perspective view of another embodiment of the magnetic lifting apparatus according to the present invention showing a pair of circular center beams disposed between a pair of magnetic substances.

As shown in FIGS. 5, 6A, and 6B, there are additional embodiments of the magnetic lifting apparatus. For example, a plurality of non-magnetic center beams 102 are disposed between the magnetic substances 1 and become a composite plate with a second melting portion 102' (FIG. 5).

A regular hexahedron configured center beam 202 is disposed between the magnetic substances 1 and becomes a composite plate with a third melting portion 202' (FIG. 6A). A rectangular tetrahedron configured center beam 302 is disposed between the magnetic substances 1 and becomes a composite plate with a fourth melting portion 302' (FIG. 6B). The thickness of the rectangular tetrahedron configured center beam 302 is less than that of the magnetic substance 1.

The magnetic lifting apparatus according to the present invention operates as follows. After an object to be lifted or moved is located under the bottom face of the magnetic lifting apparatus of the present invention and the on/off handle 11 is in the on-position and is fixed to the fixing member 12, the magnetic lifting apparatus is actuated to attach to the object. Thereafter, using a conventional machine such as a crane through the link 4', the object can be lifted or moved to another place. Thereafter, if the user wants to release the magnetic lifting apparatus from the object, it is easy for the on/off handle 11 to be in the off-position.

In assembly, the plurality of rotors 6 disposed in the corresponding plurality of rotor seat members 5 and the magnetic substances 1 are piled by the tetragonal axle 10' through the apertures 1'' and tetragonal axial aperture 6'. At this time, the magnetic substance 1 and the rotor seat member 5 with the rotor 6 become a unit so that the unit will usually include 2 to 10 rotors, preferably 3 rotors. Therefore, when the tetragonal axle 10' is rotated by the on/off handle 11, only the rotors 6 rotate and the magnetic substances 1 do not rotate. Accordingly, the rotation of the rotors 6 is very perfect, so that magnetic activity is very well controlled and the magnetic lifting apparatus of the present invention effectively functions to pull or lift the object. At this time, depending on need, the number of the rotor 6 and magnetic substance 1 can be adjusted to correspond to the weight of the object to be lifted.

Another advantage of the magnetic lifting apparatus according to the present invention is the stability thereof if any impact is applied to the apparatus because non-magnetic center beams 2 and the bolt heads 9 are melted to the magnetic substances 1 and the side wall covers 3, respectively as a composite.

Accordingly, the magnetic lifting apparatus of the present invention is firmly covered by both side wall covers 3 and the top cover 4, so that the apparatus can withstand any impact and the tetragonal axle 10' will not twist under such impact.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic lifting apparatus comprising:
   a housing defining a pair of side walls and a top cover, said pair of side walls having an inwardly angled portion extended from a top edge thereof, a plurality of first bolt apertures disposed on said pair of side walls and angled portions, and said top cover having a link member;
   at least three operatively activating members positioned adjacent to each other, each of said operatively activating members including,
   a pair of magnetic substances having a non-magnetic center beam disposed between and melted together with said pair of magnetic substances to form a back supporting member, said back supporting member having a lower back portion, opposing side walls, and a plurality of pin apertures disposed on the lower back portion thereof,
   a front supporting member attached to said back supporting member, said front supporting member having a lower front portion, a pair of first permanent magnet sets and a rotor seat, and a plurality of connecting pins disposed on the lower front portion thereof for engaging with said plurality of pin apertures,
   a pair of first permanent magnets disposed on said pair of first permanent magnet seats,
   a rotor disposed on said rotor seat, said rotor having an angular axial aperture and a pair of second permanent magnets for matching with same or different magnetic polarities of said first permanent magnets, and
   a plurality of second bolt apertures disposed on both opposing side walls of said back supporting member for mating with said first bolt apertures;
   an extreme front supporting member which is formed on a front end of said activating members and on a same side as said back supporting member, said extreme front supporting member including,
   a rotating member,
   an on/off switch handle for engagement with a fixing member attached to said extreme front supporting member, and
   an angular axle connected to said rotating member; and
   a plurality of bolts each having a bolt head, respectively, for insertion into said first and second bolt apertures and forming a composite with said pair of side walls and said top cover by melting said bolt heads thereto, whereby upon rotating the on/off switch handle, when the first permanent magnets match with the second permanent magnets in the same magnetic polarity, the magnetic lifting apparatus is in an on-position to attach to an object to be lifted or moved, and when the first permanent magnets are un-matched with the second permanent magnets in opposing polarity, the magnetic lifting apparatus is in an off-position to release from the object.

2. The magnetic lifting apparatus of claim 1, wherein said operatively activating members are about 3 to 10 in number.

3. The magnetic lifting apparatus of claim 1, wherein said angular axle and said angular axial aperture are square in cross-section, respectively.

4. The magnetic lifting apparatus of claim 1, wherein said non-magnetic center beam is a pair of circular rods.

5. The magnetic lifting apparatus of claim 1, wherein said non-magnetic center beam has a regular hexagonal rod.

6. The magnetic lifting apparatus of claim 1, wherein said non-magnetic center beam has a rectangular tetragonal rod.

* * * * *